March 31, 1953     D. AUERBACH     2,633,100

METHOD OF FASTENING FOOD WAFERS TO BIRD CAGES

Filed May 1, 195

Inventor:
Dave Auerbach
By: Jones, Tuch & Darbo
Attys

Patented Mar. 31, 1953

2,633,100

UNITED STATES PATENT OFFICE 2,633,100

METHOD OF FASTENING FOOD WAFERS TO BIRD CAGES

Dave Auerbach, Chicago, Ill.

Application May 1, 1951, Serial No. 223,848

3 Claims. (Cl. 119—18)

This invention relates to a method of fastening a food wafer to a bird cage or the like.

Food wafers embodying thin sheets of food material have been long known and used as food for fish kept in bowls as house ornaments or pets, parts of the wafer being broken off and dropped onto the surface of the water in the fish bowl, whereby the food is readily accessible to the fish for nibbling off small morsels thereof.

Food of such character and such form is also suitable for birds which are kept in cages for ornament or house pets, but it has never been so used because no suitable holder or support therefor, in a bird cage, has been known.

The present invention discloses a novel and hitherto unknown method of fastening or attaching such a food wafer to the bird cage by employing the material and properties inherent in the wafer itself and without the use of any extraneous fastening or attachment means, and with such simplicity that the housewife or other owner of the bird may employ the method for satisfactory results with an extreme minimum of time and effort, while at the same time providing a firm and secure fastening.

The novel method of the present invention will be readily understood by reference to the following more detailed description, taken together with the accompanying drawings, and in which drawings—

The numeral 11 may represent a food wafer or sheet of food material of the type here referred to and which may commonly be made of corn flour or the like, having a starchy ingredient, and say a small proportion of edible oil or egg yolk. This material is pressed into thin laminated sheets or wafers of a rectangular area of about two inches by three inches for example. When so sheeted and dried, the wafer is friable or brittle so that the animal may easily nibble off small morsels of the wafer from about the edges thereof. The material of the wafer, however, is such that when moistened its surface becomes slightly sticky and the moistened part becomes somewhat plastic.

Figure 1:
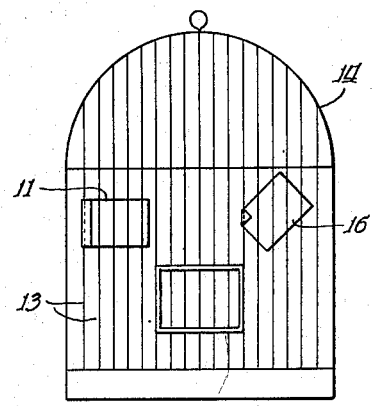
Figure 1 is an elevational view, somewhat schematic, of a conventional bird cage, with two such food wafers fastened thereto by slightly different alternative steps following the present invention.
Figure 2:
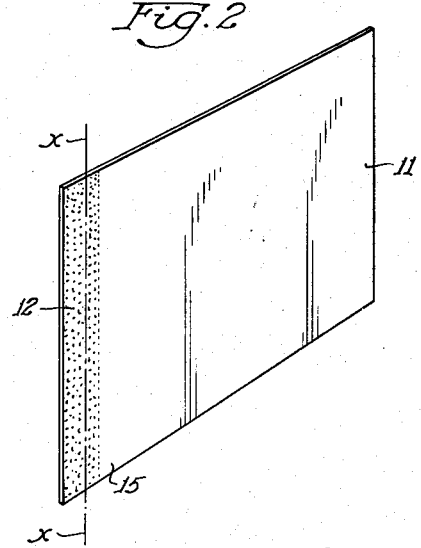
Figure 2 is a perspective view of one of the wafers, somewhat enlarged, showing a portion thereof which may be moistened in accordance with the present invention.
Figure 3:
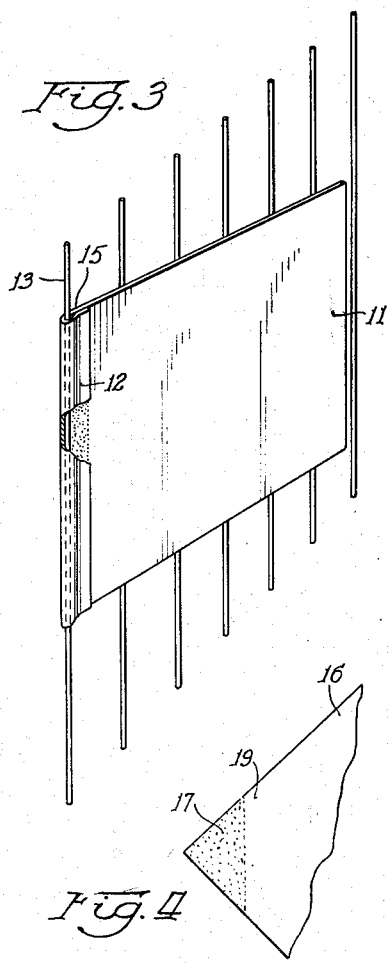
Figure 3 is an enlarged fragmentary view of some of the wires or bars of the bird cage, to which a wafer has been applied in accordance with the present invention and one alternative specific practice thereof.

In accordance with my invention, I have discovered that by moistening one edge margin 12 of the wafer the material underlying the moistened part 12 becomes sufficiently plastic so that it may be bent without breaking and it is then bent around one bar or wire for example 13 of the bird cage 14. The moistened surface 12 is then squeezed to a part of the wafer such as 15 adjacent the moistened surface 12, the part 15 being preferably dry. Thereupon the moistened part and the dry part will stick together and there is thus formed an integral fastening means for the wafer 11 on the wire 13 of the bird cage 14, somewhat resembling the mounting of a flag upon a stick (Fig. 3). I have found that the parts quickly dry and become securely fastened together providing a firm fastening which at the same time grips the wire 13 to fix the vertical relation of the wafer to the wire and to permit nibbling and breaking off of the edges of the wafer by the bird in the cage, for food purposes, without destroying the fastening of the wafer to the cage until the wafer has been so eaten away by the bird that the bird begins to eat the lapped over parts 12 and 15. Thus the fastening means itself continues to be edible by the bird and substantially little waste of the wafer occurs.

Figure 5:
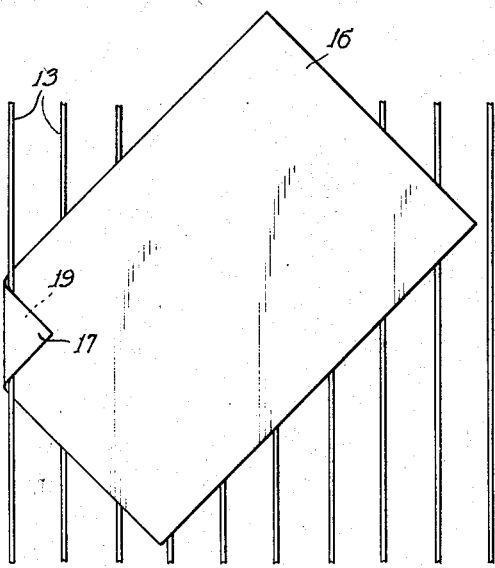
Figure 5 is a view, somewhat similar to Fig. 3, showing the further step in the application of the wafer of Fig. 4.
Figure 4:
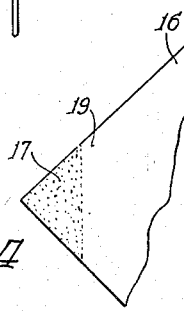
Figure 4 is a view somewhat similar to Fig. 3, broken away to save space, showing the other alternative specific practice of the invention.

To minimize still further the unused part of the wafer, immediately encircling the wire 13, an alternative practice of the invention may be practiced as shown in Figs. 4 and 5 in which the wafer 16 has only a corner portion 17 moistened, then this corner bent around the wire 13 and pressed against an adjacent portion 19. In this case, the wafer 16 is also firmly and securely attached to the wire but may be less rigid than the wafer 11. However, the wafer 16 with only its corner 17 moistened and lapped about the wire may be more quickly applied by the housewife or other owner of the bird, and a smaller amount of the wafer is unused as food by reason of the portion which immediately encircles the wire.

While the portion 15 or 19 to which the moistened portion is squeezed or pressed preferably does not have moisture applied thereto, it may if desired be slightly moistened.

The parts 12 and 17 are best moistened by licking the thumb and rubbing it over the wafer surface at its edge or corner, as the case may be, as indicated. This provides just sufficient moisture without disintegrating the material.

The wafer 11, for example, may be bent, for wrapping around the wire 13, say along the imaginary line $x-x$, within the moistened area 12.

I have thus provided a method of fastening which is readily applicable and may be employed without the use of extraneous means.

Such changes may be made as fall within the scope of the appended claims without departing from the invention.

The invention having been described, what is here claimed is:

1. Method of fastening an animal food wafer, comprising principally a pressed flour-like somewhat friable material brittle when dry but tending to disintegrate when wet, to a wire support of a bird cage or the like, which comprises moistening the surface of a marginal portion of the wafer just sufficiently to render the material somewhat plastic but not sufficiently to disintegrate the material, bending the moistened portion upon itself about the support, and lightly squeezing the moistened portion to an adjacent portion of the wafer and to the support with the support between said portions.

2. The method of claim 1 wherein the moistened portion is a rectilinear margin of the wafer.

3. The method of claim 1 wherein the moistened portion is a corner margin of the wafer.

DAVE AUERBACH.

REFERENCES CITED

The following references are of record in the file of this patent:

UNITED STATES PATENTS

| Number | Name | Date |
|---|---|---|
| 172,054 | Russell | Jan. 11, 1876 |
| 903,611 | Smith | Nov. 10, 1908 |
| 1,768,768 | Johnson | July 1, 1930 |
| 2,016,568 | Zinser | Oct. 8, 1935 |
| 2,338,685 | Dee | Jan. 4, 1944 |